(12) United States Patent
Jin et al.

(10) Patent No.: US 8,409,521 B2
(45) Date of Patent: Apr. 2, 2013

(54) TUBULAR REACTOR WITH JET IMPINGEMENT HEAT TRANSFER

(75) Inventors: Bo Jin, Orefield, PA (US); Robert Roger Broekhuis, Allentown, PA (US); Xiaoyi He, Orefield, PA (US); Shankar Nataraj, Allentown, PA (US); William Robert Licht, Allentown, PA (US); Diwakar Garg, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 167 days.

(21) Appl. No.: 13/092,378

(22) Filed: Apr. 22, 2011

(65) Prior Publication Data

US 2011/0194991 A1    Aug. 11, 2011

Related U.S. Application Data

(63) Continuation-in-part of application No. 12/190,806, filed on Aug. 13, 2008, now Pat. No. 8,178,075.

(51) Int. Cl.
| | |
|---|---|
| *B01J 8/02* | (2006.01) |
| *B01J 35/02* | (2006.01) |
| *B01J 19/00* | (2006.01) |
| *B01J 8/00* | (2006.01) |
| *B01J 8/04* | (2006.01) |
| *B01J 8/06* | (2006.01) |
| *B01J 8/08* | (2006.01) |
| *B01J 19/30* | (2006.01) |
| *B01J 19/32* | (2006.01) |

(52) U.S. Cl. ........ 422/220; 422/129; 422/187; 422/211; 422/213; 422/310; 422/312; 422/600; 422/630; 422/631; 422/632; 422/636; 422/638; 422/219

(58) Field of Classification Search .................. 422/129, 422/187, 211, 213, 220, 310, 312, 600, 630–632, 422/636, 638, 219
See application file for complete search history.

(56) References Cited

U.S. PATENT DOCUMENTS

| | | | |
|---|---|---|---|
| 4,285,910 A | * | 8/1981 | Kennedy, Jr. .................. 422/219 |
| 4,288,409 A | * | 9/1981 | Fedders et al. ................ 422/219 |
| 4,340,501 A | | 7/1982 | Davidson |
| 4,719,090 A | | 1/1988 | Masaki |
| 5,266,546 A | | 11/1993 | Hearn |
| 5,350,566 A | | 9/1994 | Stringaro |
| 5,536,699 A | | 7/1996 | Ghelfi et al. |
| 6,859,472 B2 | | 2/2005 | Betin et al. |
| 7,025,339 B2 | | 4/2006 | Meski et al. |
| 7,056,083 B2 | | 6/2006 | Gray |
| 7,100,381 B2 | | 9/2006 | Hale et al. |
| 2005/0016170 A1 | | 1/2005 | Pellizzari |
| 2005/0112056 A1 | | 5/2005 | Hampden-Smith et al. |
| 2006/0008399 A1 | | 1/2006 | Feinstein |
| 2006/0245981 A1 | | 11/2006 | Whittenberger et al. |

(Continued)

FOREIGN PATENT DOCUMENTS

EP    0 025 308 B1    7/1984

(Continued)

*Primary Examiner* — Walter D Griffin
*Assistant Examiner* — Natasha Young
(74) *Attorney, Agent, or Firm* — Bryan C. Hoke, Jr.

(57) ABSTRACT

A tubular reactor for producing a product mixture in a tubular reactor where the tubular reactor comprises an internal catalytic insert with cup-shaped structures having orifices for forming fluid jets for impinging the fluid on the tube wall. Jet impingement is used to improve heat transfer between the fluid in the tube and the tube wall in a non-adiabatic reactor. The tubular reactor and method may be used for endothermic reactions such as steam methane reforming and for exothermic reactions such as methanation.

13 Claims, 5 Drawing Sheets

U.S. PATENT DOCUMENTS

| | | |
|---|---|---|
| 2007/0025893 A1 | 2/2007 | Whittenberger et al. |
| 2007/0227173 A1 | 10/2007 | Bezama et al. |
| 2007/0297956 A1 | 12/2007 | Repasky et al. |
| 2008/0145284 A1 | 6/2008 | Whittenberger et al. |
| 2011/0014109 A1* | 1/2011 | Norsk et al. ............ 423/359 |

FOREIGN PATENT DOCUMENTS

| | | |
|---|---|---|
| EP | 0 458 472 A1 | 11/1991 |
| EP | 0 640 385 A1 | 3/1995 |
| EP | 0 867 220 A1 | 9/1998 |
| GB | 2353738 A | 3/2001 |
| WO | 2006058060 A2 | 6/2006 |
| WO | 2006113196 A2 | 10/2006 |
| WO | 2011/048361 A1 | 4/2011 |
| WO | 2011/098779 A1 | 8/2011 |

* cited by examiner

TUBULAR REACTOR WITH JET IMPINGEMENT HEAT TRANSFER

CROSS-REFERENCE TO RELATED APPLICATIONS

The application is a continuation-in-part of U.S. patent application Ser. No. 12/190,806, now U.S. Pat. No. 8,178,075, filed on Aug. 13, 2008, of which the entire contents of the application is herein incorporated by reference for all purposes.

BACKGROUND

The present invention relates to tubular reactors for producing a product mixture from a reactant mixture. More specifically, the present invention relates to improving heat transfer in tubular reactors.

Reactors containing packings with catalyst have been described, for example, tubular reactors used in steam methane reforming. The packings may be random packings such as catalyst pellets or so-called structured packing. Structured packing, as compared to random packings, can produce lower pressure drop, are not easily fluidized, and are not prone to settling or crushing. Since tubular reactors are often externally heated or cooled, another important characteristic of the reactor is related to heat transfer between the external heat source/sink and the process fluid within the reactor.

Tubular reactors may contain random packing or structured packing where the packing includes catalyst for the desired reaction. Structured packing has been credited with lower pressure drop compared to random packing.

Heat transfer in tubular reactors has been recognized as being important. Efforts relating to improving heat transfer in tubular reactors have been described.

Davidson, U.S. Pat. No. 4,340,501, describes a structure in a reactor vessel where the fluid is intermittently but controllably brought into contact with the vessel walls. As a result, Davidson states that it is possible to obtain the smooth-flow characteristics of honeycomb structures with the heat transfer characteristics of particulate beds.

In the invention according to Davidson, the process for contacting a fluid with the walls of a vessel is characterized by causing the fluid to flow alternatingly (a) through a structure within the vessel, and (b) through a space between the structure and the vessel walls. Davidson also describes an apparatus for carrying out the process comprising a vessel and a structure inside the vessel.

Repasky et al., U.S. Pat. No. 7,761,994 discloses a method and a reactor made by a method for increasing heat transfer in a tubular reactor with a structured packing. The approach is to expand the structure toward the tubular reactor wall during construction, thereby reducing the gap between the wall and the packing. The fluid is squeezed between the packing and the tube wall. The reduced gap increases the velocity of the fluid and thereby increases heat transfer.

A problem with this approach and any approach where heat transfer relies on the gap between the structure and the tube wall, is that after extended operation at high temperature and pressure, the tube may experience time-dependent plastic deformation, commonly known as "creep," resulting in an increase in the tube diameter and a corresponding increase in the gap between the tube wall and the structured packing. Since the mechanism for heat transfer relies on the velocity of the fluid in this gap, and the velocity decreases as the gap is increased, the heat transfer decreases when the tube creeps. When heat transfer is reduced the reactor performance decreases.

While random packings can move with the tube wall as the tube creeps and the heat transfer therefore not dependent on a gap between the packing and the tube wall, random packings can suffer from large pressure drops as mentioned above.

It is desirable to maintain heat transfer efficiency in a tubular reactor throughout the life of the tubular reactor especially when the tube creeps. The present invention solves the problem of heat transfer degradation resulting from tube creep in a tubular reactor.

It is desirable to improve heat transfer in tubular reactors. The present invention discloses additional features for providing improved heat transfer in tubular reactors.

BRIEF SUMMARY

The present disclosure relates to a tubular reactor with improved heat transfer characteristics.

There are several aspects of the disclosure as outlined below.

Aspect #1. A tubular reactor having a tubular reactor inlet and a tubular reactor outlet downstream of the tubular reactor inlet, the tubular reactor comprising:

a tube having a tube wall and an axis in a lengthwise direction of the tube, and an insert disposed within the tube, wherein the insert comprises:

a plurality of cup-shaped structures consecutively arranged in the lengthwise direction of the tube, each of the plurality of cup-shaped structures having an upstream end, a downstream end, and a side wall enclosing a central space between the upstream end and the downstream end, wherein a supported catalyst is disposed within the central space of each of the plurality of cup-shaped structures, wherein the upstream end defines an inlet to the central space, wherein the central space is at least partially blocked at the downstream end, wherein the side wall defines a plurality of orifices suitable for forming jets of a fluid directed from the central space toward the tube wall, wherein for each of the plurality of cup-shaped structures, an outer space is formed between the side wall and the tube wall, the outer space extending from the upstream end to the downstream end of each of the plurality of cup-shaped structures, the outer space in fluid flow communication with the inlet of an adjacent downstream cup-shaped structure and/or the tubular reactor outlet; and wherein the cross-sectional area of the outer space in a first plane normal to the axis of the tube and passing through the downstream end of a first cup-shaped structure of the plurality of cup-shaped structures is greater than the cross-sectional area of the outer space in a second plane normal to the axis of the tube and passing through an orifice adjacent the upstream end of the first cup-shaped structure, said orifice belonging to the plurality of orifices defined by the side wall of the first cup-shaped structure.

Aspect #2. The tubular reactor of aspect #1 further comprising:
a beaded flow deflector disposed at the upstream end of the first cup-shaped structure of the plurality of cup-shaped structures, the beaded flow deflector comprising a plurality of beads wherein each of the plurality of beads touches the tube wall.

Aspect #3. A tubular reactor having a tubular reactor inlet and a tubular reactor outlet downstream of the tubular reactor inlet, the tubular reactor comprising:
a tube having a tube wall and an axis in a lengthwise direction of the tube, and
an insert disposed within the tube, wherein the insert comprises:
a plurality of cup-shaped structures consecutively arranged in the lengthwise direction of the tube, each of the plurality of cup-shaped structures having an upstream end, a downstream end, and a side wall enclosing a central space between the upstream end and the downstream end,
wherein a supported catalyst is disposed within the central space of each of the plurality of cup-shaped structures,
wherein the upstream end defines an inlet to the central space,
wherein the central space is at least partially blocked at the downstream end,
wherein the side wall defines a plurality of orifices suitable for forming jets of a fluid directed from the central space toward the tube wall, and
wherein for each of the plurality of cup-shaped structures, an outer space is formed between the side wall and the tube wall, the outer space extending from the upstream end to the downstream end of each of the plurality of cup-shaped structures, the outer space in fluid flow communication with the inlet of an adjacent downstream cup-shaped structure and/or the tubular reactor outlet; and
a beaded flow deflector disposed at the upstream end of a first cup-shaped structure of the plurality of cup-shaped structures, the beaded flow deflector comprising a plurality of beads, wherein each of the plurality of beads touches the tube wall.

Aspect #4. The tubular reactor of Aspect #3
wherein the cross-sectional area of the outer space in a first plane normal to the axis of the tube and passing through the downstream end of the first cup-shaped structure of the plurality of cup-shaped structures is greater than the cross-sectional area of the outer space in a second plane normal to the axis of the tube and passing through an orifice adjacent the upstream end of the first cup-shaped structure, said orifice belonging to the plurality of orifices defined by the side wall of the first cup-shaped structure.

Aspect #5. The tubular reactor of any one of Aspects #1, #2 or #4 wherein a second cup-shaped structure of the plurality of cup-shaped structures is disposed adjacent and upstream of the first cup-shaped structure wherein a distance of less than 15 mm separates the downstream end of the second cup-shaped structure from the upstream end of the first cup-shaped structure.

Aspect #6. The tubular reactor of any one of Aspects #1 to #5 wherein the central space is at least partially blocked at the downstream end by a plate-like structure.

Aspect #7. The tubular reactor of any one of Aspects #2 to #6 wherein each of the plurality of beads have a hole defined therein, wherein the plurality of beads are threaded on a wire passing through each hole, each hole having a dimension greater than the dimension of the wire thereby allowing movement of the plurality of beads to maintain contact with tube wall when the tube wall diameter changes.

Aspect #8. The tubular reactor of any one of Aspects #2 to #7 wherein the beaded flow deflector is supported by the side wall of the first cup-shaped structure.

Aspect #9. The tubular reactor of any one of Aspects #2 to #7 wherein the first cup-shaped structure comprises a baffle at the upstream end wherein the baffle circumscribes the inlet of the first cup-shaped structure, and wherein the beaded flow deflector is supported by the baffle.

Aspect #10. The tubular reactor of any one of Aspects #2 to #9 wherein the plurality of beads are each spherical.

Aspect #11. The tubular reactor of any one of Aspects #2 to #9 wherein the plurality of beads are each cylindrical.

Aspect #12. The tubular reactor of any one of Aspects #2 to #9 wherein the plurality of beads are each segments of a toroid.

Aspect #13. The tubular reactor of any one of Aspects #1 to #12 wherein each of the plurality of cup-shaped structures have a circular cross-section.

Aspect #14. The tubular reactor of any of Aspects #1 to #13 wherein the side wall of each of the plurality of cup-shaped structures is tapered, having a larger diameter at the upstream end than at the downstream end.

Aspect #15. The tubular reactor of any of Aspects #1 to #13 wherein the side wall of each of the plurality of cup-shaped structures has a cylindrical portion and a tapered portion adjoining the cylindrical portion, wherein the cylindrical portion is upstream of the tapered portion, and wherein the tapered portion has a larger diameter at its end adjoining the cylindrical portion.

Aspect #16. The tubular reactor of any one of Aspects #1 to #15, wherein at least a portion of the plurality of orifices are slotted.

Aspect #17. The tubular reactor of any one of Aspects #1 to #16 wherein the plurality of orifices are characterized by a hydraulic diameter, d, and a spacing, h, from the tube wall, wherein h/d for the plurality of orifices is in a range of 0.5 to 20.

Aspect #18. The tubular reactor of any one of Aspects #1 to #17 wherein the first cup-shaped structure has a length, L, in the lengthwise direction, and the tube has a diameter, D, normal to the lengthwise direction, wherein $$0.3 \leq \frac{L}{D} \leq 3,$$

or from $$0.3 \leq \frac{L}{D} \leq 1.3.$$

Aspect #19. The tubular reactor of any one of Aspects #1 to #18 wherein a screen and/or perforated plate is disposed at the upstream end of the central space of the first cup-shaped structure to constrain the supported catalyst.

DETAILED DESCRIPTION

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list.

As used herein, the term "plurality" means two or more.

As used herein, the term "supported catalyst" refers to a catalyst on a suitable support. The support may contain additives to improve the properties of the catalyst support.

Downstream and upstream refer to the intended flow direction of the process fluid transferred. If the intended flow direction of the process fluid is from the first device to the second device, the second device is in downstream fluid flow communication of the first device.

For the purposes of this disclosure, reference to the term "diameter" means hydraulic diameter for non-circular cross-sections. The hydraulic diameter is defined $$D_H = \frac{4 \times \text{volume of liquid}}{\text{surface wetted by liquid}}.$$

The present disclosure relates to a tubular reactor with improved heat transfer. Improved heat transfer is provided by jet impingement of the process fluid on the tube wall of the tubular reactor. Jet impingement heat transfer intensity may be preserved by ensuring that the process gas does not sweep away another jet after impingement, but instead has a clear flow path that does not interfere with another jet. Increased heat transfer can generally be obtained with increased momentum transfer (corresponding to an increased pressure drop) since both are analogous processes. The present tubular reactor provides for increased heat transfer without high pressure drop by improved geometry.

Tubular reactors are particularly suited for the production of hydrogen and/or synthesis gas (syngas) where the product mixture may comprise $H_2$ and CO. Tubular reactors may also be used for other reaction process, such as water gas shift, partial oxidation, hydrogenation, the Haber process, methanation, desulfurization of gases, dehydrogenation, catalytic oxidation, and ammoxidation.

Tubular reactors are well-known in the chemical and petrochemical industries. Tubular reactors comprise a tube enclosing a catalyst on a support. The catalyst may be supported on catalyst pellets or a so-called structured packing. Suitable catalysts for desired reactions are known in the art. For the case of hydrogen and/or synthesis gas production, the catalyst may be a steam reforming catalyst. Suitable catalysts for steam methane (hydrocarbon) reforming are known in the art. Any suitable catalyst may be selected and used in the reactor.

The present invention is concerned with non-adiabatic tubular reactors where heat is supplied or removed from the tubular reactor through the tube wall.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the invention is to cover the scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
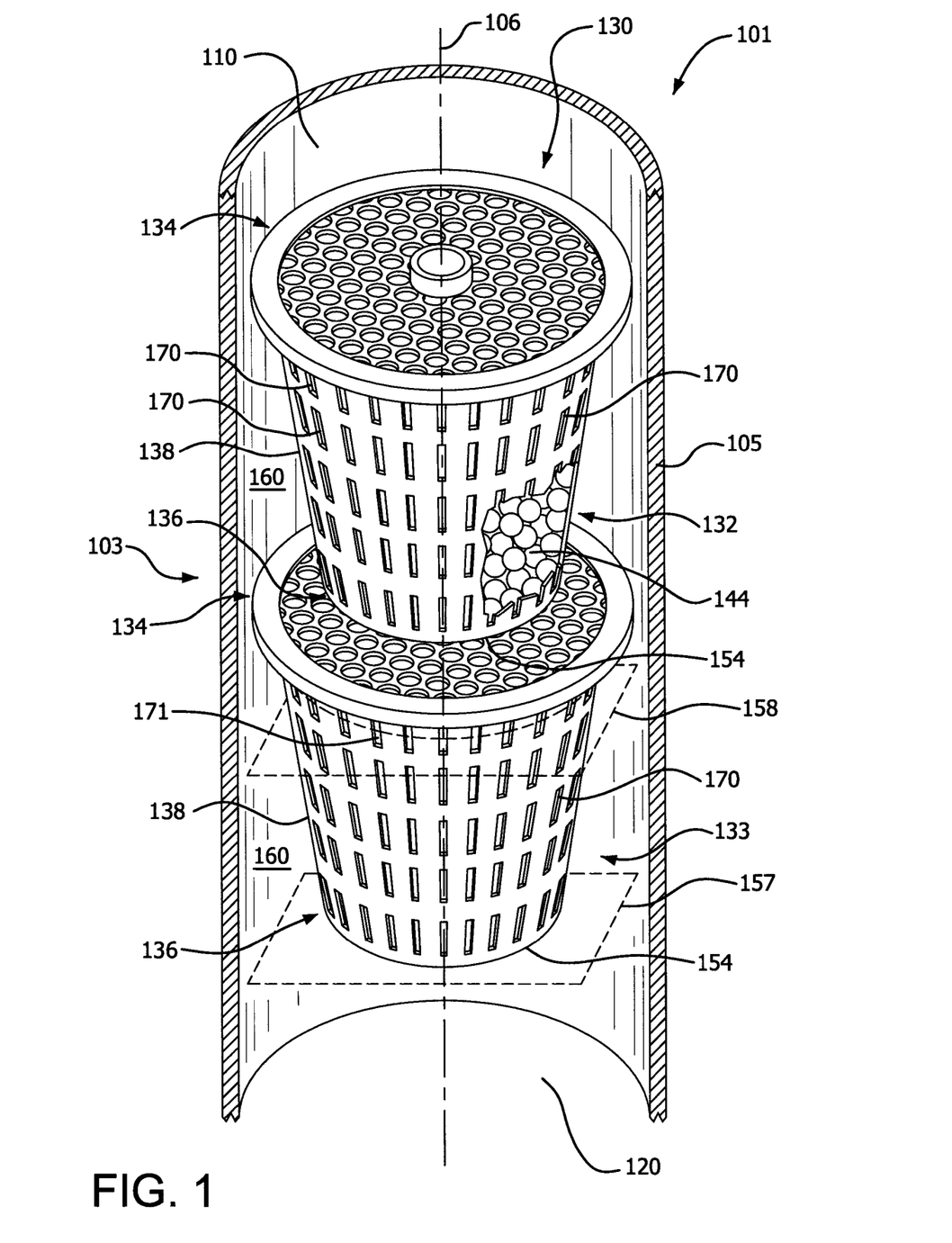
FIG. 1 is a schematic showing a portion of a tubular reactor with cup-shaped structures for creating jet impingement on the tube wall.
Figure 2:
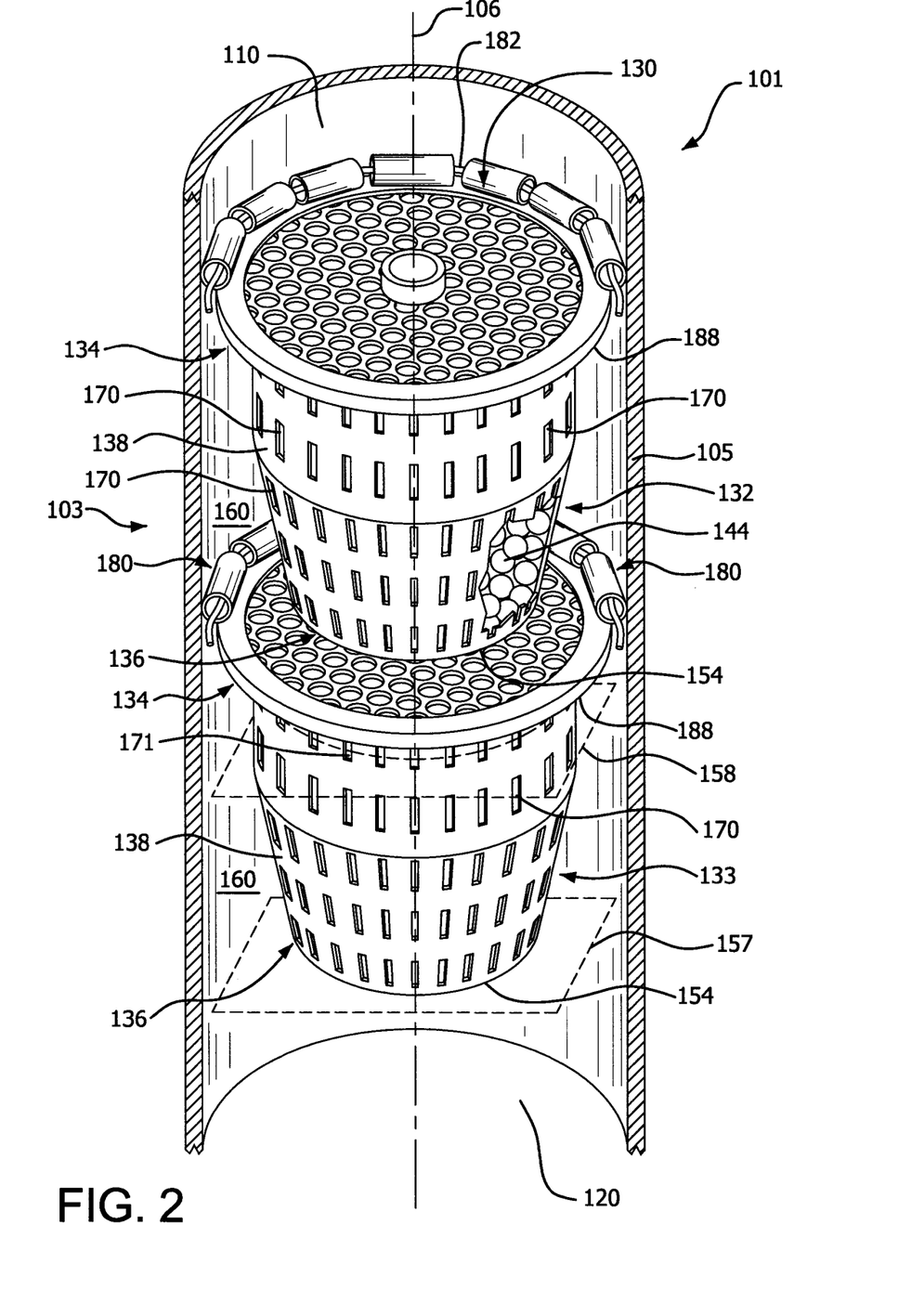
FIG. 2 is a schematic showing a portion of a tubular reactor with cup-shaped structures for creating jet impingement on the tube wall and beaded flow deflectors.

With reference to FIGS. 1 and 2, the tubular reactor 101 has a tubular reactor inlet 110 and a tubular reactor outlet 120 downstream of the tubular reactor inlet 110. The tubular reactor 101 comprises a tube 103 having a tube wall 105 and an axis 106 in a lengthwise direction of the tube 103. The tubular reactor also comprises an insert 130 disposed or situated within the tube 103.

A tube is defined herein as any fluid tight, hollow body for conducting or conveying a fluid within the tube. The tube may have circular cross section, a square cross section or other desired shape. The tube has a longitudinal axis running lengthwise and positioned along the geometric centers of the cross sections of the tube. The lengthwise direction corresponds to the direction from the inlet to the outlet of the reactor.

The tube 103 may be fabricated from any material suitable for the desired application. Suitable materials for tubular reactors for hydrogen and/or syngas production are known in the art.

The insert 130 comprises a plurality of cup-shaped structures 132, 133 consecutively arranged in the lengthwise direction of the tube 103. Each of the plurality of cup-shaped structures 132, 133 have an upstream end 134, a downstream end 136, and a side wall 138 enclosing a central space between the upstream end 134 and the downstream end 136. The upstream end 134 defines an inlet to the central space. The cup-shaped structures may be constructed from metal, a ceramic material, or any other suitable material. Suitable materials of construction may be selected for the particular application. Suitable materials of construction for hydrogen and/or syngas production are known in the art. Metal cup-shaped structures may be fabricated by conventional metal working methods. Ceramic cup-shaped structures may be cast by conventional ceramic making techniques.

The cup-shaped structures may have a circular cross-section, complementary to a tube cross-section also having a circular cross-section.

The side walls of the cup-shaped structures may be tapered, having a larger diameter at the upstream end than at the downstream end. As used herein, the term "tapered" means to become progressively smaller toward one end, to diminish gradually. Tapered side walls are useful because they allow the distance between adjacent cup-shaped structures to become smaller without restricting the flow between cup-shaped structures. The flow restriction between straight side wall cup-shaped structures causes an increase in pressure drop.

As illustrated in the embodiment shown in FIG. 2, the side wall of each of the plurality of cup-shaped structures may have a cylindrical portion and a tapered portion adjoining the cylindrical portion, wherein the cylindrical portion is upstream of the tapered portion, and wherein the tapered portion has a larger diameter at its end adjoining the cylindrical portion.

The cup-shaped structures have a length, L, in the lengthwise direction traversing from the upstream end 134 to the downstream end 136. The tube has a diameter, D, normal to the lengthwise direction. The length of the cup-shaped structures may be constructed such that $$0.3 \le \frac{L}{D} \le 3 \text{ or } 0.3 \le \frac{L}{D} \le 1.3.$$

The aspect ratio of L/D impacts the uniformity of tube wall temperature and pressure drop in the tubular reactor. A lower L to D ratio is preferred to improve uniformity of tube wall temperature while not significantly increasing the pressure drop.

A supported catalyst 144 is disposed or located within the central space of each of the plurality of cup-shaped structures 132, 133. The supported catalyst may be a catalyst supported on porous ceramic pellets of the type commonly used to support catalyst. The supported catalyst may be a catalyst supported on a structured support. The catalyst may be a steam reforming catalyst. Suitable steam reforming catalysts are known in the art.

A screen and/or perforated plate may be disposed at the upstream end of the central space of the cup-shaped structures to constrain the supported catalyst. The screen and/or perforated plate are useful for dealing with fluidization of catalyst pellets.

The central space is at least partially blocked at the downstream end 136. The central space may be at least partially blocked at the downstream end 136 by a flat plate-like structure 154 as shown in FIGS. 1 and 2. Alternatively, the downstream end 136 or bottom of the cup-shaped structure may be concave, convex, or any suitable shape.

The side wall 138 of each of the cup-shaped structures defines a plurality of orifices 170, 171 suitable for forming jets of a fluid directed from the central space toward the tube wall 105. As used herein, an orifice is an opening (such as a hole) through which something may pass. Orifices may be circular holes or may have other desired shapes such as slits or slots.

The term "slot" as used herein is defined as an opening wherein any slot cross-section is non-circular and is characterized by a major axis and a minor axis. The major axis is longer than the minor axis and the two axes are generally perpendicular. The slot may have a cross-section of any non-circular shape and each cross-section may be characterized by a center point or centroid, where centroid has the usual geometric definition.

The orifices may be characterized by a hydraulic diameter, d, and a spacing, h, from the tube wall, wherein h/d for the orifices is in a range of 0.5 to 20. For the purposes of this disclosure, the spacing, h, is the distance between the geometric center of the orifice and a point on the tube wall closest to the geometric center of the orifice. The spacing, h, and the hydraulic diameter, d, are parameters, not specific values. The values for the spacing, h, and the hydraulic diameter, d, need not be the same for each of the plurality of orifices. The values may be purposefully varied from insert portion to insert portion or even within an insert portion. The spacing, h, may range from 0.5 mm to 10 mm or may range from 1 mm to 10 mm.

A particular benefit of the present tubular reactor is that heat transfer is not degraded due to the tube wall creeping after extended operation. Heat transfer is degraded in previous methods that rely on squeezing of the fluid between the insert and the tube wall because when the tube wall diameter increases, the gap between the insert and the tube wall increases resulting in a lower velocity of the fluid. The lower velocity results in decreased heat transfer.

By contrast, the present tubular reactor purposefully does not rely on the gap between the insert and the tube wall to provide efficient heat transfer, but rather the jet velocity. Since the hydraulic diameter of the orifices does not change after extended operation of the tubular reactor, the velocity of the fluid does not change for a given flow rate, and heat transfer efficiency is maintained.

Jets of process fluid impinge on the tube wall thereby transferring heat between fluid jets and the tube wall. Jet impingement enhances heat transfer between the tube wall and the process fluid by diminishing the boundary layer that would otherwise build up along the tube wall. The jets may be directed substantially perpendicular to the tube wall surface or at an angle to the tube wall. The angle may be within of ±45° of the normal to the tube wall. Heat is transferred between the tube and the process fluid meaning that heat may be transferred from the tube to the process fluid or from the process fluid to the tube. After the process fluid impinges on the tube wall, the process gas has to flow away, down the annulus between the cup-shaped structure and the tube wall, and into the adjacent downstream cup-shaped structure. If the process gas builds up sufficient velocity, the process gas can sweep the jets away and thereby degrade heat transfer. The mass of the post-impingement process gas increases from the top of the cup-shaped structure to the bottom of the cup-shaped structure, as more and more process gas exits the orifices. By suitably tapering the cup-shaped structure side wall, flow resistance for the process gas is reduced, preserving the heat transfer while reducing pressure drop.

For each of the plurality of cup-shaped structures 132, 133, an outer space 160 is formed between the side wall 138 and the tube wall 105. The outer space extends from the upstream end 134 to the downstream end 136 of each of the plurality of cup-shaped structures 132, 133. Each of the cup-shaped structures has its respective outer space 160. The outer space 160 is in fluid flow communication with the inlet of an adjacent downstream cup-shaped structure or, in the case of the most downstream cup-shaped structure, the tubular reactor outlet 120.

The outer space 160 is for collecting the fluid after it impinges on the tube wall 105 and passing the fluid to the inlet of an adjacent downstream cup-shaped structure. An outer space in fluid flow communication with the inlet of an adjacent downstream cup-shaped structure, means that at least a portion of a fluid flowing through the outer space passes into the inlet of the adjacent downstream cup-shaped structure.

The outer space for the cup-shaped structure furthest downstream will be in fluid flow communication with and thereby pass fluid to the tubular reactor outlet.

The term "adjacent" means nearby and may or may not include contact but does require absence of anything of the same kind in between.

As shown in the embodiments of FIG. 1 and FIG. 2, the cross-sectional area of the outer space 160 in a first plane 157 normal to the axis 106 of the tube 103 and passing through the downstream end 136 of cup-shaped structure 133 is greater than the cross-sectional area of the outer space 160 in a second plane 158 normal to the axis 106 of the tube 103 and passing through an orifice 171 adjacent the upstream end 134 of cup-shaped structure 133, said orifice 171 belonging to the plurality of orifices 170, 171 defined by the side wall 138 of cup-shaped structure 133. Orifice 171 is adjacent the upstream end 134 of cup-shaped structure 133, meaning that there are no other orifices between this orifice and the upstream end.

Another cup-shaped structure 132 may be disposed adjacent and upstream of cup-shaped structure 133 wherein a distance of less than 15 mm separates the downstream end 136 of cup-shaped structure 132 from the upstream end 134 of cup-shaped structure 133. This is an improvement compared to structures where the spacing is greater since the gap between structures does not have jet impingement heat transfer, leading to localized hot spots. The tapered geometry of the cup-shaped structures facilitates the closer spacing between cup-shaped structures, while reducing the flow resistance as the process gas flows from a cup-shaped structure to the adjacent downstream cup-shaped structure.

The spacing between cup-shaped structures may be provided by a spacer or each of the cup-shaped structures may be attached to a central rod connected to each of the cup-shaped structures and running the length of the tube.

In the embodiment shown in FIG. 2, the tubular reactor 101 further comprises a beaded flow deflector 180 disposed at the upstream end 134 of cup-shaped structure 133. The beaded flow deflector 180 comprises a plurality of beads wherein each of the beads touches the tube wall 105.

The function of the beaded flow deflector is to at least partially block flow from entering the outer space at the upstream end of the cup-shaped structure and direct the flow into the inlet of each cup-shaped structure.

The beads may be made from ceramic materials, for example the same ceramic materials used for the catalyst pellets.

The beads may be spherical, cylindrical, segments of a toroid, or any other suitable shape.

The beads have an outer dimension that prevents them from passing through the gap between the side wall or baffle and the tube wall at the upstream end.

The beaded flow deflector 180 may be supported by the side wall 138 of the cup-shaped structure 133. The beaded flow deflector 180 may be constrained by a lip which prevents the beads from moving inward. This lip may allow the beads to move within a narrow range in response to thermal growth of the tube, but prevents gross displacement. This lip may be a continuation of the side wall of the cup or a separate component.

In the embodiment shown in FIG. 2, the cup-shaped structure 133 comprises a baffle 188 at the upstream end 134 wherein the baffle 188 circumscribes the inlet of the cup-shaped structure 133, and wherein the beaded flow deflector 180 is supported by the baffle 188. A baffle is any device, such as a plate, wall, or screen, that deflects the flow of a fluid.

A distinguishing feature between the beaded flow deflector and the baffle is that the beaded flow deflector maintains contact with the tube wall as the tube wall diameter increases/decreases, providing deflection of the process gas into the cup-shaped structure inlet even as the tube diameter increases/decreases. By contrast, the baffle diameter changes only due to its thermal expansion changes and therefore is not as effective as the beaded flow deflector for preventing process fluid from bypassing the inlet to the cup-shaped structure, and instead flowing directly to the outer space between the side wall of the cup-shaped structure and the tube wall.

As illustrated in the embodiment of FIG. 2, the beads may each have a hole defined in the beads themselves, and the beads may be threaded on a wire 182 passing through each hole. Each hole may have a dimension (e.g. a hydraulic diameter) greater than the dimension (e.g. diameter) of the wire thereby allowing movement of the beads for maintaining contact of the beads with tube wall when the tube wall diameter changes. The wire may be made from a high temperature alloy such as SS347, Incoloy 800H, or other suitable material.

The beads may be threaded on a string (made of a polymeric material) where the string is burnt off or steam-gasified off during start-up of the tubular reactor.

The beads may alternatively be held in place by an adhesive when the insert is installed in the tube. The adhesive may be burnt off during start-up of the tubular reactor. The beads may be held in place by any suitable technique or mechanism.

In an alternative embodiment, which includes the beaded flow deflector 180, the cross-sectional area of the outer space 160 in a first plane 157 normal to the axis 106 of the tube 103 and passing through the downstream end 136 of a cup-shaped structure 133 may be the same as the cross-sectional area of the outer space 160 in a second plane 158 normal to the axis 106 of the tube 103 and passing through an orifice 171 adjacent the upstream end 134 of the cup-shaped structure 133, said orifice 171 belonging to the plurality of orifices 170, 171 defined by the side wall 138 of the cup-shaped structure 133.

The tubular reactor described here is used in a manner similar to other tubular reactors for their respective chemical processing requirements.

Use of the tubular reactor described herein is well-understood by the skilled person, particularly in view of U.S. Pub. No. 2010/0038593.

EXAMPLES

The technical effect of the plurality of orifices for jet impingement heat transfer was investigated using Computational Fluid Dynamics (CFD) modeling. The technical effect of the tapered cup-shaped structure was also investigated as was the technical effect of the beaded flow deflector.

CFD modeling was validated against heat transfer experiments.

Heat transfer experiments were carried out for various packings. The heat transfer coefficient was measured as a function of the pressure drop through the tube. The experiments were conducted using air as the fluid and the tube was electrically heated. The experiments were conducted at roughly atmospheric pressure and ambient temperature. The heat transfer coefficient was calculated from wall temperature measurements for various flow rates.

Figure 3:
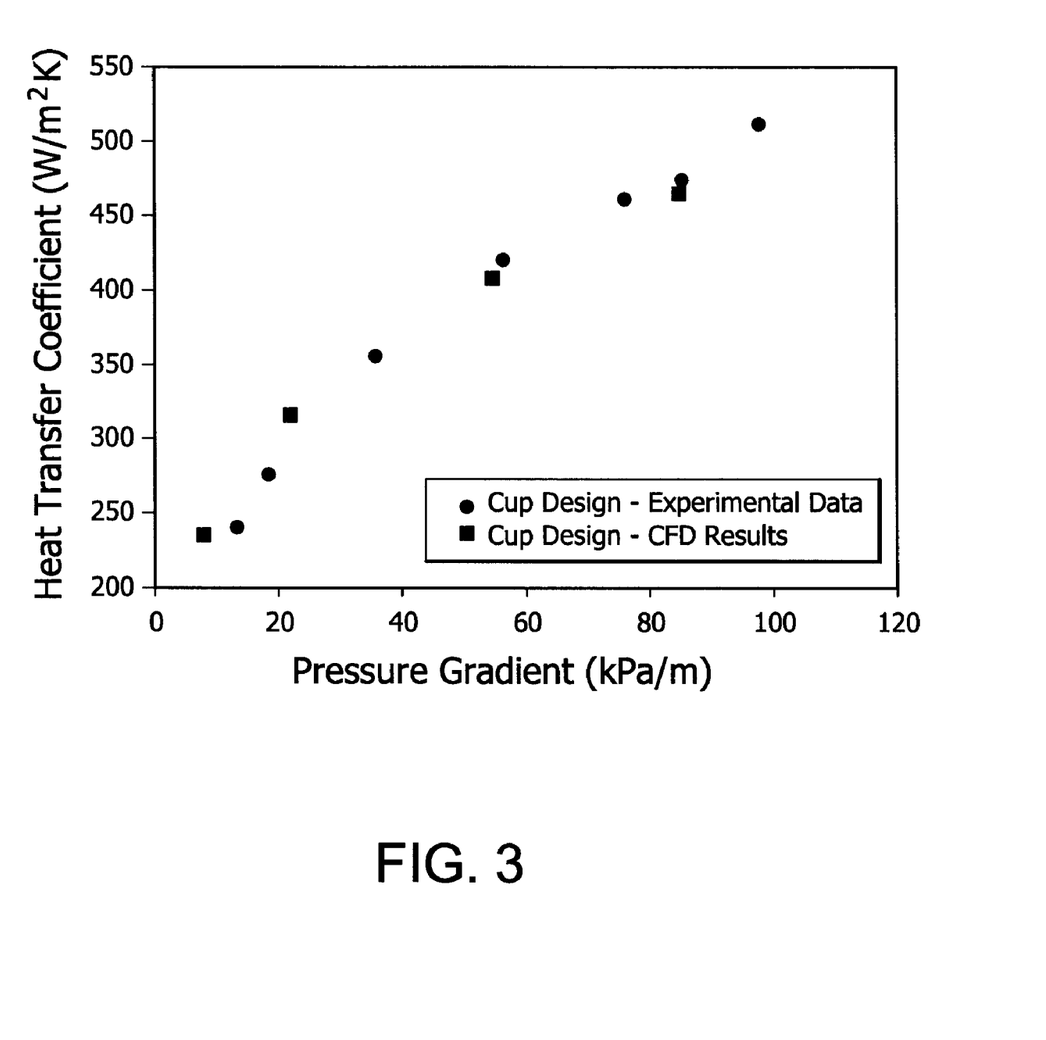
FIG. 3 is a plot of heat transfer coefficient versus pressure gradient through a tubular reactor comparing experimental data and computational fluid dynamics simulation results.

The results of CFD simulations are compared to experimental data in FIG. 3. For the "straight-wall cup design," similar to the structure illustrated in FIG. 1, except that the side wall of the cup was straight and not tapered as shown in the figure. In the "straight-wall cup design," the spacing between the orifice opening and the tube wall is about 3 mm.

The cup-shaped structure had a length of about 33 mm, with an 18 mm distance between adjacent cup-shaped structures. The cup-shaped structure had an open top and a sealed bottom. The diameter of the side wall was about 96 mm. The side wall had a total of 60 slots, each with a width of about 1 mm. The upstream end of the cup-shaped structures each had a baffle to block the flow passage between the metal structure wall and the tube wall. The gap between the outer diameter of the baffle and the tube for the CFD simulations was 1 mm.

The close agreement between the CFD modeling results and the heat transfer experiments indicates suitable reliability of the CFD modeling.

Figure 4:
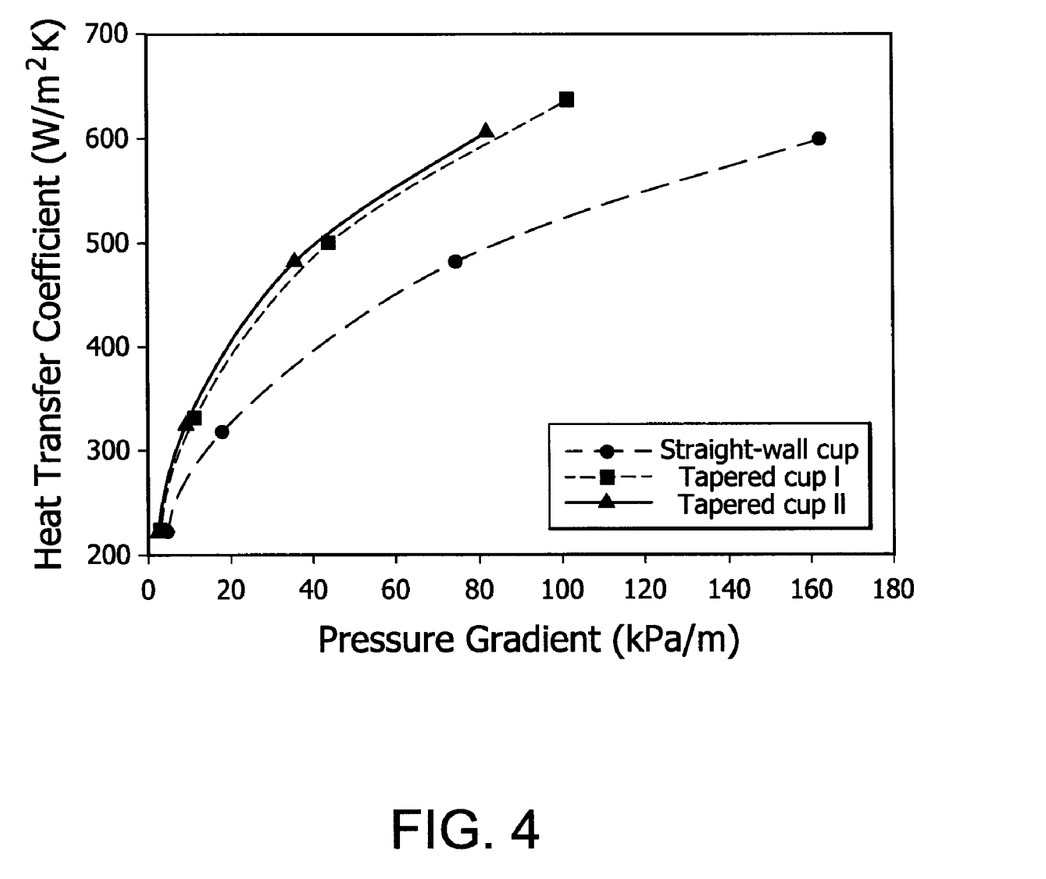
FIG. 4 is a plot of heat transfer coefficient versus pressure gradient comparing cup-shaped structure geometries.

FIG. 4 shows results of CFD simulations for two "tapered cup designs" compared with the "straight-wall cup design." For both tapered cup designs and the straight-wall cup design, the side wall had a total of 28 slots, each with a width of about 1 mm. Both tapered cup designs and straight-wall cup design had cup-shaped structures with a length of about 66 mm, with a 7.6 mm distance between adjacent cup-shaped structures.

The difference between the two tapered cup designs was the shape of the cup side wall, and therefore the spacing between the orifice opening and the tube wall. The side wall of tapered cup I has a cylindrical portion and a tapered portion like that shown in FIG. 2. More precisely, the top half (top 50%) of the cup-shaped structure is cylindrical and the bottom half is tapered. The spacing between the orifice openings and the tube wall is about 3 mm for the top half of the cup-shaped structure, and varies from 3 mm at the middle of the cup-shaped structure to 9 mm at the bottom of the cup-shaped structure.

Tapered cup II is tapered throughout its length, like that shown in FIG. 1. The spacing between the orifice openings increases linearly from about 3 mm at the top of the cup shaped structure to 9 mm at the bottom of the cup-shaped structure.

The spacing between the orifice openings and the tube wall for the straight-wall cup was 6 mm, corresponding to the average spacing for tapered cup II.

As shown in FIG. 4, each of the tapered cup designs provide about 25% higher heat transfer compared to the straight-cup design for the same pressure drop. Alternatively stated, for the same heat transfer, the tapered cup-shaped structure design can significantly reduce the pressure drop.

Figure 5:
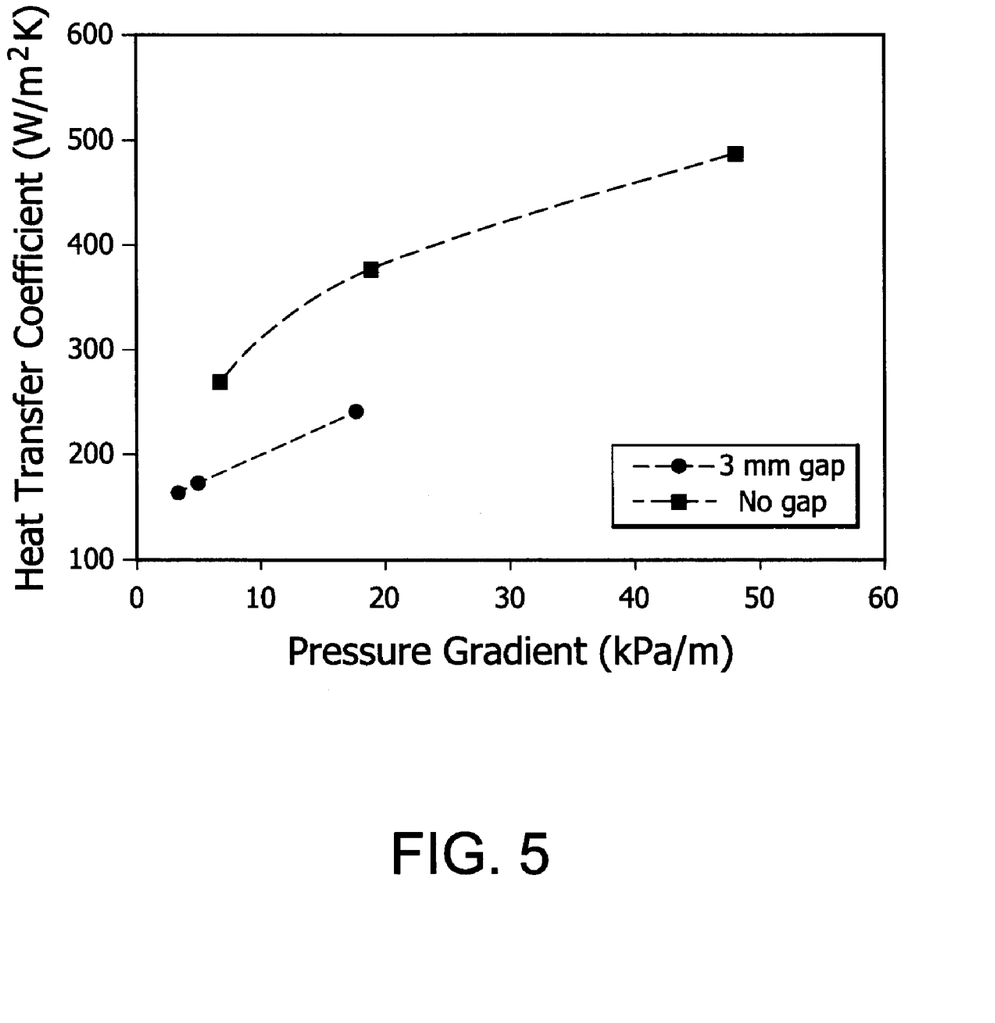
FIG. 5 is a plot of heat transfer coefficient versus pressure gradient illustrating the effect of a beaded flow deflector.

FIG. 5 shows a comparison for a straight-cup design with and without a gap between the cup-shaped structure at the upstream end. The case with a gap represents a cup-shaped structure without a beaded flow deflector or baffle at the upstream end, where the gap between the side wall of the cup-shaped structure and the tube wall is 3 mm. The case without a gap represents a case with a beaded flow deflector.

The tube diameter is 102 mm. The length and diameter of the cup-shaped structure is about 33 mm and about 96 mm, respectively. The distance between cup-shaped structures is about 17.8 mm. The side wall had a total of 56 slots, each with a width of about 1 mm. The distance between the side wall of the cup-shaped structure and the tube wall is 3 mm for both cases.

The results clearly show a significant improvement in heat transfer for the case with no gap (with beaded flow deflector) corresponding to no process fluid by-passing the inlet to the cup-shaped structure. In addition to the improvement to heat transfer, improved conversion is also expected since all of the process fluid is forced to pass through the catalyst containing space of the cup-shaped structure.

Although the present invention has been described as to specific embodiments or examples, it is not limited thereto, but may be changed or modified into any of various other forms without departing from the scope of the invention as defined by the accompanying claims.

We claim:

1. A tubular reactor having a tubular reactor inlet and a tubular reactor outlet downstream of the tubular reactor inlet, the tubular reactor comprising:
   a tube having a tube wall and an axis in a lengthwise direction of the tube, and
   an insert disposed within the tube, wherein the insert comprises:
      a plurality of cup-shaped structures consecutively arranged in the lengthwise direction of the tube, each of the plurality of cup-shaped structures having an upstream end, a downstream end, and a side wall enclosing a central space between the upstream end and the downstream end,
      wherein a supported catalyst is disposed within the central space of each of the plurality of cup-shaped structures,
      wherein the upstream end defines an inlet to the central space,
      wherein the central space is at least partially blocked at the downstream end,
      wherein the side wall defines a plurality of orifices suitable for forming jets of a fluid directed from the central space toward the tube wall,
      wherein for each of the plurality of cup-shaped structures, an outer space is formed between the side wall and the tube wall, the outer space extending from the upstream end to the downstream end of each of the plurality of cup-shaped structures, the outer space in fluid flow communication with the inlet of an adjacent downstream cup-shaped structure and/or the tubular reactor outlet; and
      wherein the cross-sectional area of the outer space in a first plane normal to the axis of the tube and passing through the downstream end of a first cup-shaped structure of the plurality of cup-shaped structures is greater than the cross-sectional area of the outer space in a second plane normal to the axis of the tube and passing through an orifice adjacent the upstream end of the first cup-shaped structure, said orifice belonging to the plurality of orifices defined by the side wall of the first cup-shaped structure.

2. The tubular reactor of claim 1 further comprising:
   a beaded flow deflector disposed at the upstream end of the first cup-shaped structure of the plurality of cup-shaped structures, the beaded flow deflector comprising a plurality of beads, wherein each of the plurality of beads touches the tube wall.

3. The tubular reactor of claim 2 wherein each of the plurality of beads have a hole defined therein, wherein the plurality of beads are threaded on a wire passing through each hole, each hole having a dimension greater than the dimension of the wire.

4. The tubular reactor of claim 2 wherein the beaded flow deflector is supported by the side wall of the first cup-shaped structure.

5. The tubular reactor of claim 2 wherein the first cup-shaped structure comprises a baffle at the upstream end wherein the baffle circumscribes the inlet of the first cup-shaped structure, and wherein the beaded flow deflector is supported by the baffle.

6. The tubular reactor of claim 1 wherein a second cup-shaped structure of the plurality of cup-shaped structures is disposed adjacent and upstream of the first cup-shaped structure wherein a distance of less than 15 mm separates the downstream end of the second cup-shaped structure from the upstream end of the first cup-shaped structure.

7. The tubular reactor of claim 1 wherein the central space is at least partially blocked at the downstream end by a plate-like structure.

8. The tubular reactor of claim 1 wherein the side wall of each of the plurality of cup-shaped structures is tapered, having a larger diameter at the upstream end than at the downstream end.

9. The tubular reactor of claim 1 wherein the side wall of each of the plurality of cup-shaped structures has a cylindrical portion and a tapered portion adjoining the cylindrical portion, wherein the cylindrical portion is upstream of the tapered portion, and wherein the tapered portion has a larger diameter at its end adjoining the cylindrical portion.

10. The tubular reactor of claim 1, wherein at least a portion of the plurality of orifices are slotted.

11. The tubular reactor of claim 1 wherein the first cup-shaped structure has a length, L, in the lengthwise direction, and the tube has a diameter, D, normal to the lengthwise direction, wherein $$0.3 \le \frac{L}{D} \le 3.$$

12. The tubular reactor of claim 1 wherein a screen and/or perforated plate is disposed at the upstream end of the central space of the first cup-shaped structure to constrain the supported catalyst.

13. A tubular reactor having a tubular reactor inlet and a tubular reactor outlet downstream of the tubular reactor inlet, the tubular reactor comprising:

a tube having a tube wall and an axis in a lengthwise direction of the tube, and
an insert disposed within the tube, wherein the insert comprises:
a plurality of cup-shaped structures consecutively arranged in the lengthwise direction of the tube, each of the plurality of cup-shaped structures having an upstream end, a downstream end, and a side wall enclosing a central space between the upstream end and the downstream end,
wherein a supported catalyst is disposed within the central space of each of the plurality of cup-shaped structures,
wherein the upstream end defines an inlet to the central space,
wherein the central space is at least partially blocked at the downstream end,
wherein the side wall defines a plurality of orifices suitable for forming jets of a fluid directed from the central space toward the tube wall, and
wherein for each of the plurality of cup-shaped structures, an outer space is formed between the side wall and the tube wall, the outer space extending from the upstream end to the downstream end of each of the plurality of cup-shaped structures, the outer space in fluid flow communication with the inlet of an adjacent downstream cup-shaped structure and/or the tubular reactor outlet; and
a beaded flow deflector disposed at the upstream end of a first cup-shaped structure of the plurality of cup-shaped structures, the beaded flow deflector comprising a plurality of beads, wherein each of the plurality of beads touches the tube wall.

* * * * *